United States Patent [19]

Sagane

[11] Patent Number: 5,357,492

[45] Date of Patent: Oct. 18, 1994

[54] APPARATUS FOR INDICATING TIMES AND/OR DATE IN PORTABLE RECORDING UNIT

[75] Inventor: Tomonari Sagane, Kanagawa, Japan

[73] Assignee: Sony Corporation, Tokyo, Japan

[21] Appl. No.: 82,377

[22] Filed: Jun. 28, 1993

[30] Foreign Application Priority Data

Jul. 2, 1992 [JP] Japan .................................. 4-175668

[51] Int. Cl.$^5$ .............................................. G04B 19/24
[52] U.S. Cl. ...................................... 368/204; 368/31; 368/34; 368/10
[58] Field of Search .............................. 368/10, 28–40, 368/203, 204

[56] References Cited

U.S. PATENT DOCUMENTS 4,695,168  9/1987  Meister et al. ........................ 368/31
4,775,963 10/1988  Soltermann et al. ................. 368/31

Primary Examiner—Bernard Roskoski
Attorney, Agent, or Firm—Hill, Steadman & Simpson

[57] ABSTRACT

A clock apparatus includes a clock circuit having a display portion for displaying time and date and a nonvolatile memory. Upon every usage of the apparatus, at least the year at the present time is taken from the clock circuit and is stored in the memory. Upon turning on a power supply for driving the clock circuit after turning-off of the power supply, a setting unit reads the content of the memory and sets at least the year of the read content in the clock circuit as an initial value.

8 Claims, 2 Drawing Sheets

APPARATUS FOR INDICATING TIMES AND/OR DATE IN PORTABLE RECORDING UNIT

BACKGROUND OF THE INVENTION

1. Field of the Invention

The present invention generally relates to clock apparatuses and, more particularly, is directed to a clock apparatus used for a video tape recorder (VTR) having a built-in camera, a remote control commander for a VTR and the like.

2. Description of the Related Art

A clock apparatus is sometimes provided in a VTR having a built-in camera, a remote control commander for a VTR and the like, for example. Such clock apparatus employs, as a power supply for driving it, a lithium battery which is usable for a long time of 4 to 5 years as long as it is used only for driving the clock apparatus.

Such a power supply, however, must be exchanged by a new one upon the lapse of 4 to 5 years after the start of usage. When electric power is interrupted or turned off upon exchange of the power supply, a counter and the like incorporated in the clock apparatus are reset, so that it is required to set a time of the clock apparatus to the present or current time upon turning the new power supply on.

In this case, the aforementioned VTR having a built-in camera and the remote control commander for a VTR are restricted to the provision of a switch for the time setting or the like due to the requirement for miniaturization of the apparatus, so that the time setting must be performed only by using an updown key, for example.

The conventional clock apparatus is arranged in a manner such that, when the counter or the like incorporated in the clock apparatus are reset, manufactured date and time of the apparatus, for example, are set therein as an initial value. In this respect, if 4 to 5 years have passed after the start of usage of the power supply, quite a large number of operations are required to set the present date and time based on the initial value by using only the updown key, thereby forcing very troublesome operations on the user.

OBJECTS AND SUMMARY OF THE INVENTION

Therefore, it is an object of the present invention to provide an improved clock apparatus in which the aforementioned shortcomings and disadvantages encountered with the prior art can be eliminated.

More specifically, it is an object of the present invention to provide a clock apparatus which can set the present date and time with a small number of operations upon exchange of a power supply thereof.

As an aspect of the present invention, there is provided a clock apparatus which includes a display unit for displaying time and date, and a setting unit for setting at least the year at which the apparatus was used last in a case where a power supply for driving the display unit is turned on after a turning-off of the power supply.

As another aspect of the present invention, there is provided a clock apparatus which includes a clock circuit having a display unit for displaying time and date and a non-volatile volatile memory unit, wherein upon every usage of the apparatus, at least the year at the present time is taken from the clock circuit and is stored in the memory unit, and upon turning on a power supply for driving the clock circuit after turning-off of the power supply, a setting unit reads a content of the memory unit and sets at least the year of the read content in the clock circuit as an initial value.

Preferably, the power supply is a battery.

Preferably, the setting unit includes a central processing unit.

Preferably, both the display unit and the setting unit are provided in a video tape recorder having a built-in camera.

Preferably, both the display unit and the setting unit are provided in a remote control commander for an electronic apparatus.

According to the thus constituted clock apparatus, since data indicating when the apparatus was used last is set as an initial value, the number of operations for setting the present time can be reduced greatly.

The preceding and other objects, features, and advantages of the present invention will become apparent from the following detailed description of an illustrative embodiment thereof when read in conjunction with the accompanying drawings.

DETAILED DESCRIPTION OF THE PREFERRED EMBODIMENT

A clock apparatus according to an embodiment of the present invention will be described with reference to FIGS. 1 to 2B.

Figure 1:
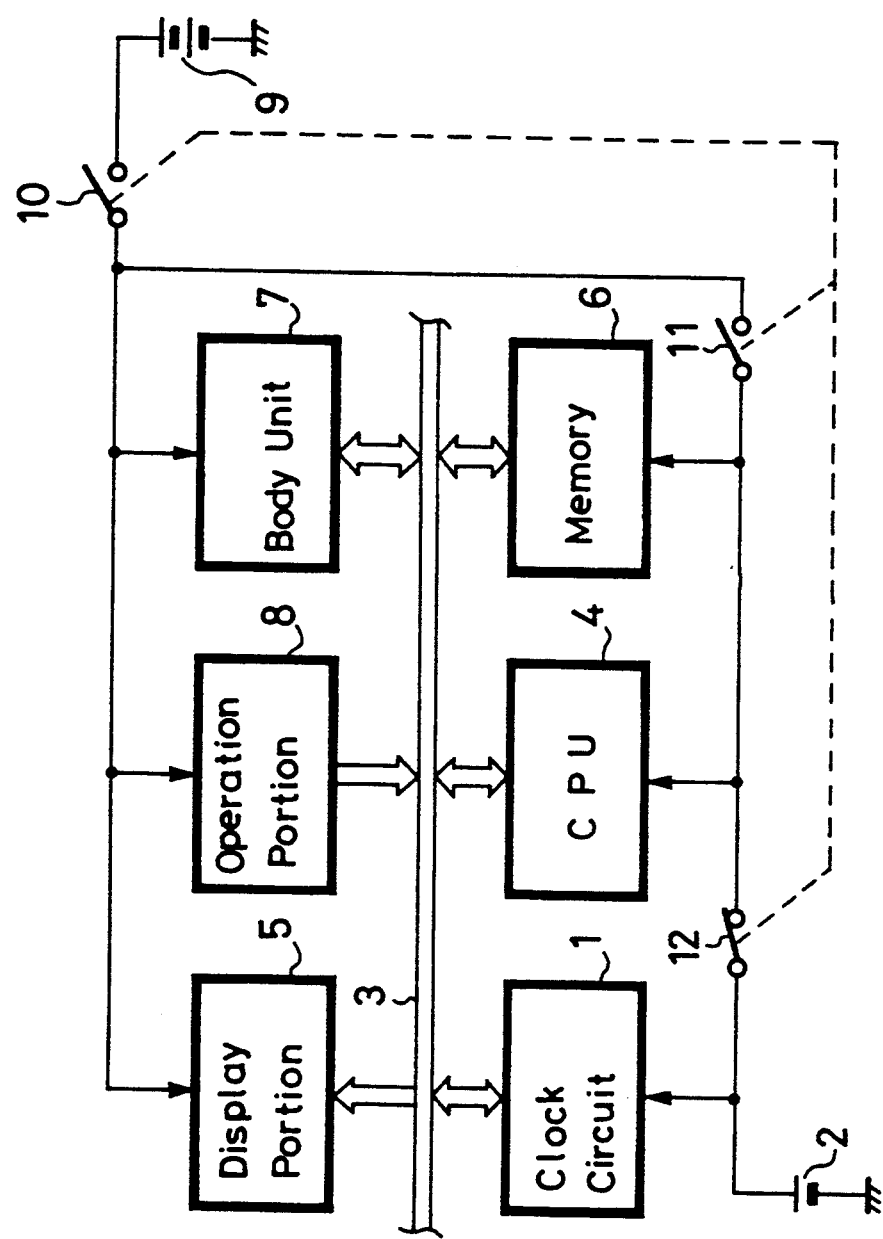
FIG. 1 shows in block form an arrangement of a clock apparatus according to an embodiment of the present invention.

FIG. 1 shows in block form an arrangement of the clock apparatus according to the embodiment.

Referring to FIG. 1, a clock circuit 1 has the function of counting time and date, and is driven by a lithium battery 2, for example. Data representing year, month, day, time and minute counted by a counter (not shown) of the clock circuit 1 is supplied to a central processing unit (CPU) 4 through a data bus 3. The data is further supplied to a display portion 5, which then displays the present or current year, month, day, time and minute thereon. The CPU 4 supplies data to a memory 6 through the data bus 3.

An operation portion 8 supplies data to the CPU through the data bus 3. The CPU 4 further supplies data through the data bus 3 to a body unit 7 which then entirely controls operations of the clock apparatus.

A main power supply 9 is connected to the display portion 5, the body unit 7 and the operation portion 8 through a switch 10, and is further connected to the CPU 4 and the memory 6 through the switch 10 and a switch 11. Furthermore, the lithium battery 2 is connected to the CPU 4 and the memory 6 through a switch 12.

The switches 10, 11 and 12 are interlocked in a manner such that the switches 10 and 11 are turned on and off simultaneously so as to be the same state, but the switch 12 is changed over into a state opposite to that of the switches 10 and 11. As a consequence, both the CPU 4 and the memory 6 are always connected to one of the main power supply 9 and the lithium battery 2.

Accordingly, the memory 6 serves as a non-volatile memory.

Figure 2A:
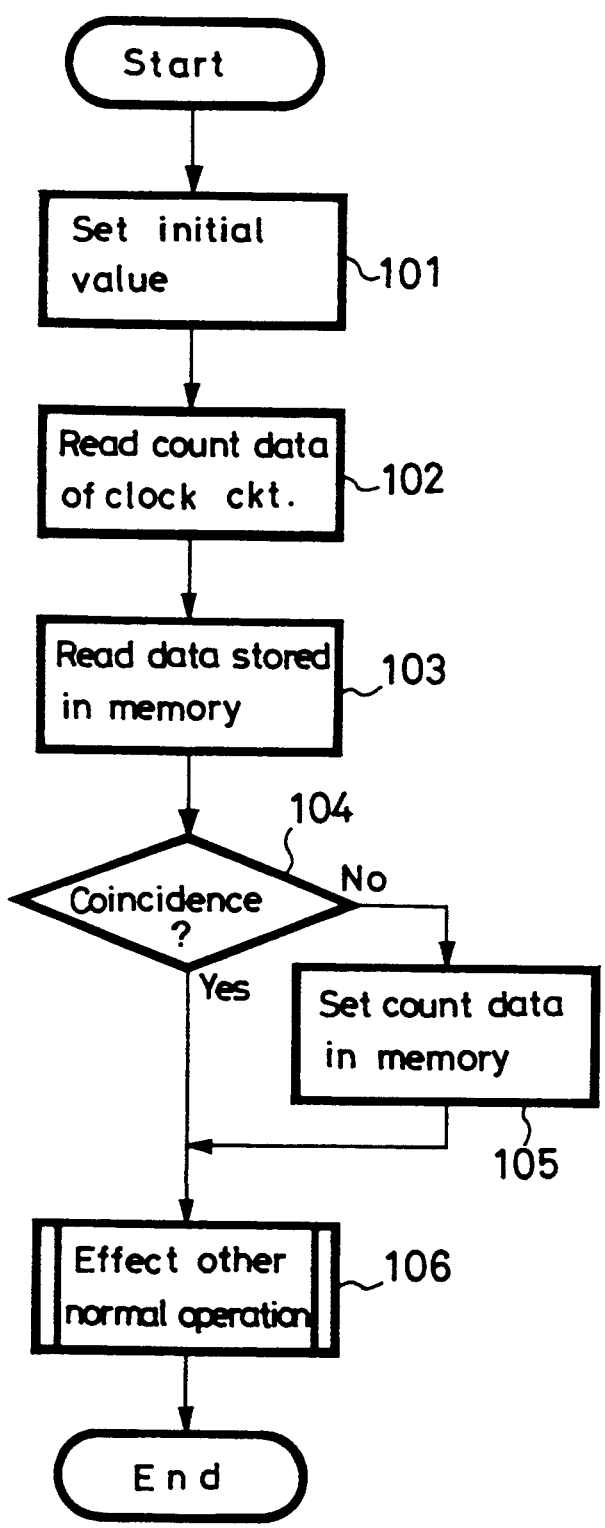
FIGS. 2A and 2B are flowcharts used to explain operations of the embodiment shown in FIG. 1, respectively.
Figure 2B:
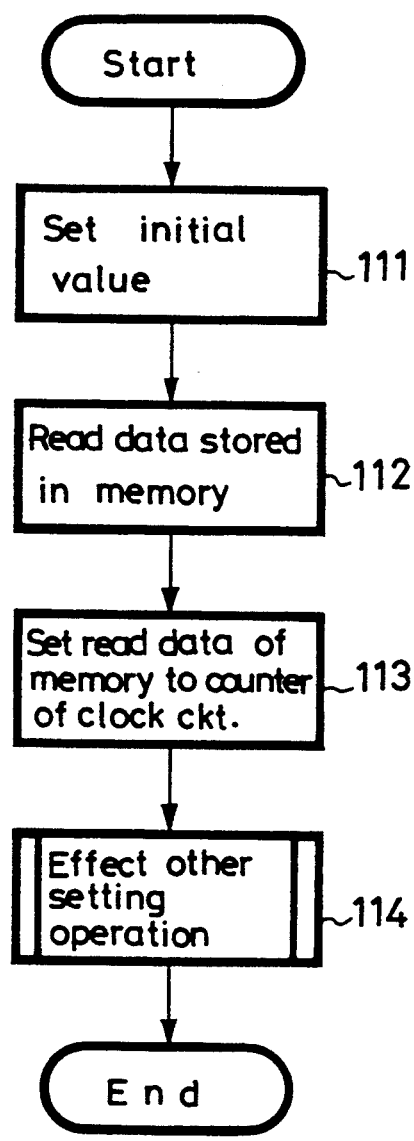

Operation procedure of the thus constituted clock apparatus under the control of the CPU 4 in the case of using the apparatus will be explained with reference to FIG. 2A. Referring to FIG. 2A, first an initial value is set when the operation is started in step 101. Then, data of year and month, for example being counted by the counter of the clock circuit 1, is read in step 102.

Then, the processing proceeds to step 103, where data of year and month, for example, stored in the memory 6 is read, and thereafter the processing proceeds to the next decision step 104, where the data obtained in step 103 is compared with the read data obtained instep 102. If it is determined at step 104 that the data of year and month obtained in step 102 is not coincident with that obtained in step 103, then the processing proceeds to step 105, where the data obtained in step 102 is stored in the memory 6. Thereafter, the processing proceeds to step 106, where other normal operations for the clock apparatus are performed. If it is determined at step 104 that the data of year and month obtained in step 102 is coincident with that obtained in step 103, then the processing also proceeds to step 106.

Operation procedure of the clock apparatus under the control of the CPU 4 will be explained with reference to FIG. 2B in which case the power supply, that is, the lithium battery 2 for driving the clock circuit 1, is turned on again after interruption or turning-off thereof due to the exchange thereof. Referring to FIG. 2B, first an initial value is set when the operation is started in step 111. Then, data of year and month stored in the memory 6 is read in step 112.

Thereafter, the processing proceeds to step 113, where the data of year and month read from the memory 6 in step 112 is set in the counter of the clock circuit 1. Then, the processing proceeds to step 114, where other setting operations for the clock apparatus are performed.

Accordingly, in the thus constituted clock apparatus, the memory 6 always stores the data representing year and month at which the clock apparatus was used at the last time, and further the stored data of year and month is read and set in the counter of the clock circuit 1 when turning on the power supply, that is, the lithium battery after turning off the same. Therefore, a user can start the setting operation of the present time in the clock circuit 1 based on the year and month at which the apparatus was used at the last time, which greatly reduces the number of operations for setting the present time.

As described above, since data at which the apparatus was used at the last time can be set as an initial value, the number of operations for setting the present time can be reduced greatly.

The thus constituted clock apparatus according to the invention is particularly effective when it is incorporated in an apparatus having a function other than a clock function, such as a VTR having a built-in camera, a remote control commander for a VTR and the like. When the clock apparatus is used in a VTR having a built-in camera, for example, since the VTR is used sometimes with an interval of one month or more, it is useless to store in the memory 6 data such as day and time, other than year and month. In this respect, it is useful when only year is stored in the memory 6.

In contrast, when the clock apparatus is used in a remote control commander for a VTR, since the commander is usually used with an interval shorter than a few days, it is useful to store day as well as year and month in the memory 6.

Having described a preferred embodiment of the invention with reference to the accompanying drawings, it is to be understood that the invention is not limited to the precise embodiment and that various changes and modifications could be effected therein by one skilled in the art without departing from the spirit or scope of the invention as defined in the appended claims.

What is claimed is:

1. A clock apparatus, comprising:
   a clock circuit having a display for displaying time and date;
   a non-volatile memory;
   a replaceable power source for driving said clock circuit;
   an apparatus which is turned on and off by a user and which is associated with the time and date display of said clock circuit;
   memory resetting means for reading current time and date data of said clock circuit and reading time and date data stored in said memory when a user turns on said associated apparatus, and for comparing the clock circuit data with the memory data, and if there is coincidence, not resetting the memory, and if there is not coincidence, resetting the memory to the current time and date data of the clock circuit; and
   clock circuit resetting means for resetting said clock circuit to time and date data stored in said memory when said removable power source is removed and replaced by a new removable power source.

2. An apparatus according to claim 1 wherein said user activated apparatus employing said time and date comprises a TV camera.

3. An apparatus according to claim 1 wherein said apparatus associated with said time and date display comprises a video tape recorder.

4. An apparatus according to claim 1 wherein said removable power supply comprises a battery.

5. An apparatus according to claim 1 wherein said memory resetting means comprises a central processing unit.

6. An apparatus according to claim 1 wherein said clock circuit resetting means comprises a central processing unit.

7. An apparatus according to claim 1 wherein said apparatus associated with said time and date display comprises a remote control commander for an electronic device.

8. A clock system, comprising:
   a clock circuit having a display for displaying at least date;
   a non-volatile memory;
   a replaceable battery for driving said clock circuit;
   an apparatus which is turned on and off by a user and which utilizes the date of said clock circuit;
   memory resetting means for reading current date data of said clock circuit and reading date data stored in said memory when a user turns on said apparatus which utilizes the date, and for comparing the clock circuit data with the memory data, and if there is coincidence, not resetting the memory, and if there is not coincidence, resetting the memory to the current date data of the clock circuit; and
   clock circuit resetting means for resetting said clock circuit to date data stored in said memory when said removable power source is removed and replaced by a new removable power source.

* * * * *